May 19, 1964  A. E. BRYMER, JR  3,133,806
ADAPTOR FOR SIZING AND COOLING WARE
Filed Dec. 23, 1960  3 Sheets-Sheet 3
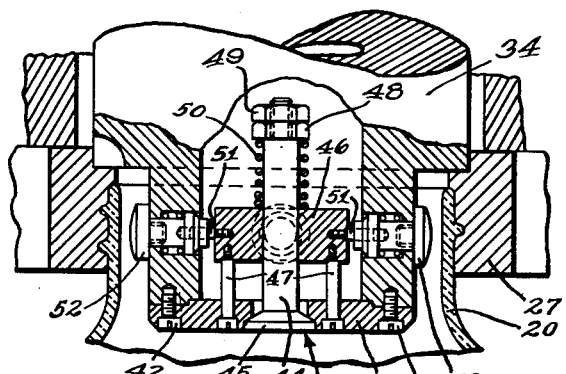
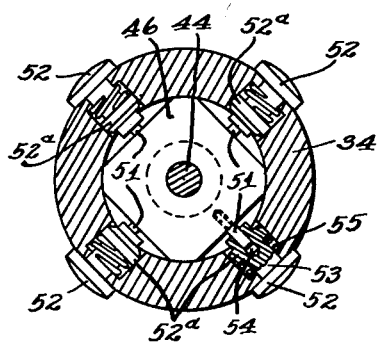
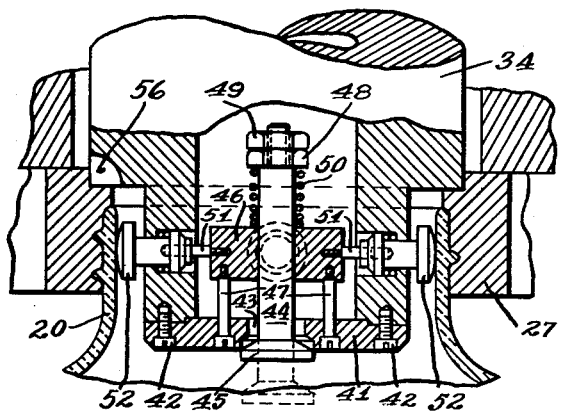
INVENTOR.
ANDREW E. BRYMER JR.
BY
D. T. Innis
and
J. R. Nelson
ATTORNEYS

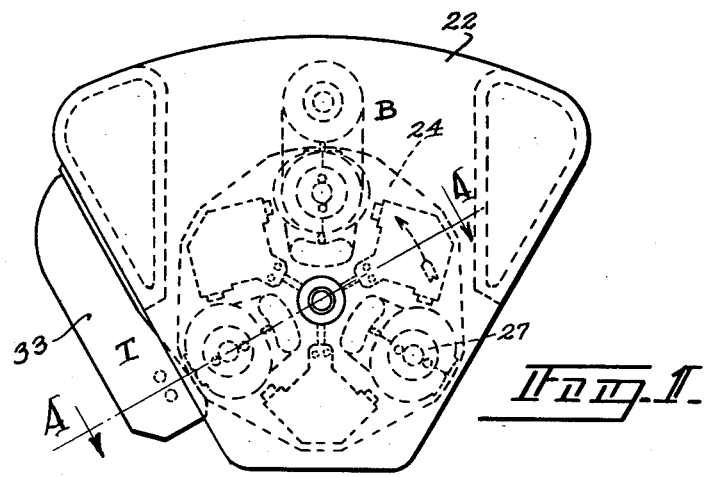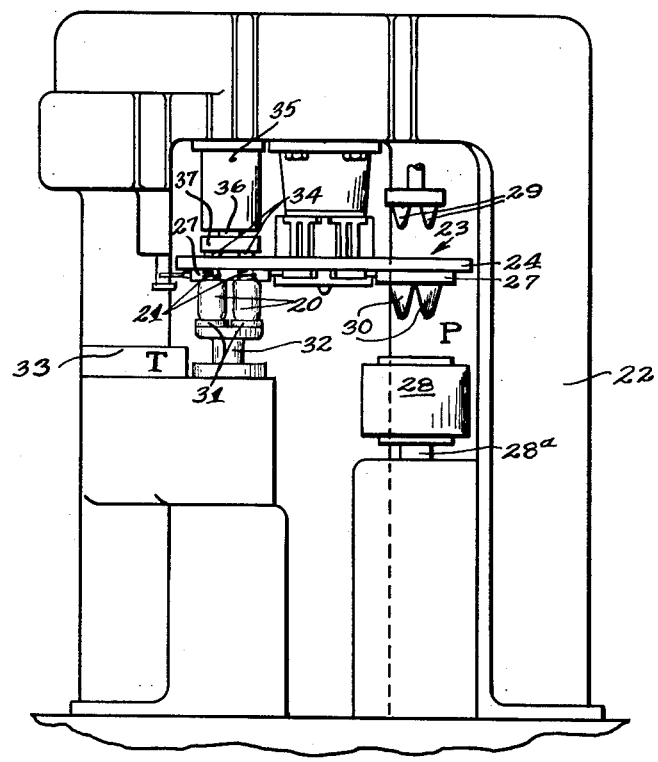

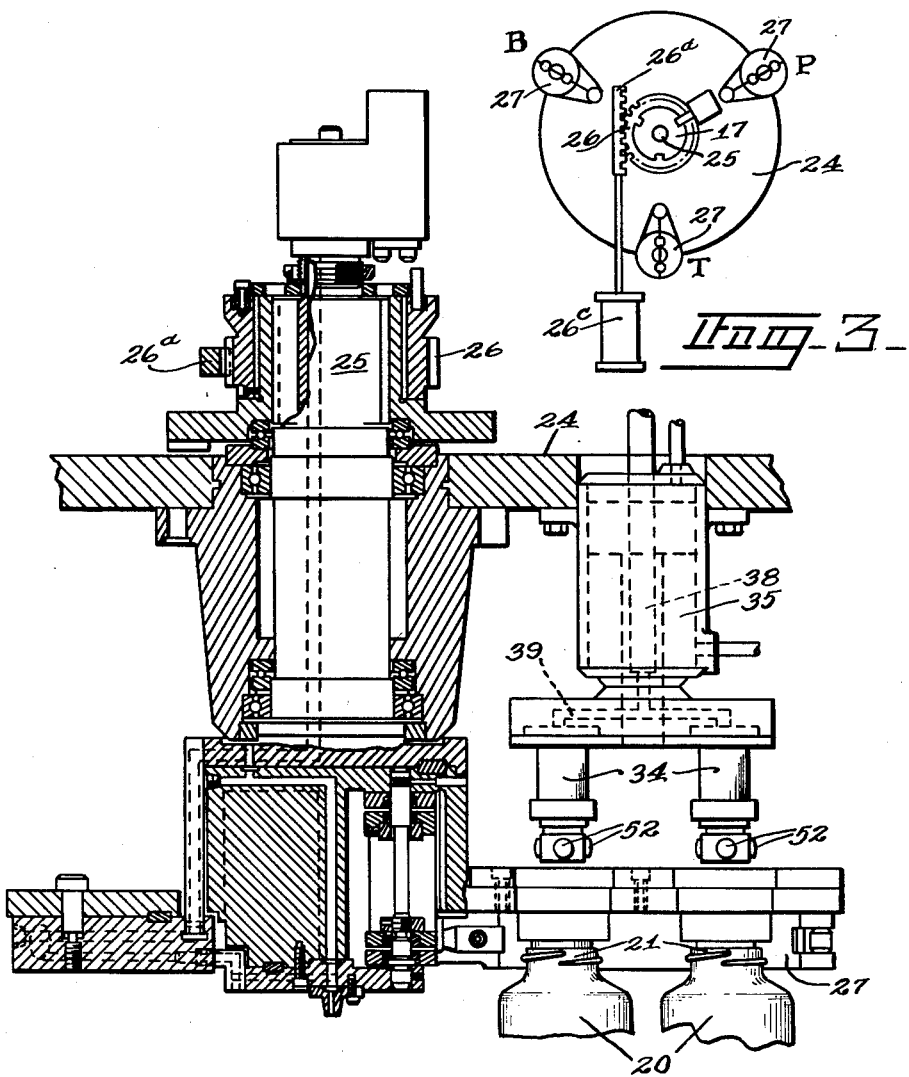

United States Patent Office 3,133,806
Patented May 19, 1964

3,133,806
ADAPTOR FOR SIZING AND COOLING WARE
Andrew E. Brymer, Jr., Toledo, Ohio, assignor to Owens-Illinois Glass Company, a corporation of Ohio
Filed Dec. 23, 1960, Ser. No. 78,070
6 Claims. (Cl. 65—268)

This invention relates to apparatus for cooling hollow articles prior to their removal from the forming machine. More particularly, this invention relates to an apparatus for maintaining the neck portion of a hollow glass article "in round" at the time of its release from the neck molds of a ware forming machine.

The machine as shown is of the type in which the neck portion of the hollow article is molded within a neck ring or mold separate from the body mold. The neck molds consist of partible sections held in closed position by fluid pressure. The charge of molten glass is introduced into the combined neck molds and parison molds. The charge is then given a hollow form and the neck portion of the articles are molded in the neck mold by press plungers. The neck mold carriage is then rotated to bring the parison, while suspended from the neck mold, to the blowing station where the parison is enclosed in a finishing mold and blown to finished form. The next step rotation of the carriage brings the blown article, still carried by the neck molds, to a takeout station where the neck molds are opened and the molded article is removed. When the neck molds are opened, there is a tendency for the ware to move either with one or the other of the neck mold halves and consequently, to distort the neck portion of the article into an oblong shape. Furthermore, unequal contact time between the individual neck mold halves and the neck portion of the article will tend to produce unequal chilling and also cause some slight "out of roundness" of the neck of the article.

Pressure is maintained on the neck mold clamping cylinders while the neck mold is at the pressing and blowing stations. When the neck mold is brought to the takeout station the high pressure line is interrupted and the clamping mechanism connected through a low pressure line to exhaust during the opening of the neck mold. The neck mold is opened by a pair of rock arms which spread the neck mold arms apart. After removal of the molded article the neck mold arms are returned to mold closing position through the operation of the mold clamping cylinders.

It is an object of this invention to provide mechanism at the takeout station which will be inserted within the neck mold and expanded to maintain the neck portion of the article circular at the time that the neck molds are opened.

It is a further object of this invention to provide mechanism for insuring that the size of the neck portions of successively made articles are uniformly shaped and to additionally provide cooling air to the interior of the finished articles at the takeout station.

Other and further objects will be apparent from the following descriptive material taken in conjunction with the attached drawings wherein:

FIG. 1 is a plan view of a press molding machine embodying the invention;

FIG. 2 is an elevational view of the machine partly diagrammatic;

FIG. 3 is a diagrammatic view showing means for intermittently rotating the mold carriage;

FIG. 4 is a schematic part sectional view on a larger scale and with parts broken away, the section being at line 4—4 on FIG. 1;

FIG. 5 is a schematic enlarged sectional view taken through the cooling and sizing adaptor of the invention;

FIG. 6 is a view similar to FIG. 5 with parts shown in actuated position;

FIG. 7 is a cross sectional view taken at line 7—7 on FIG. 5.

The machine as herein shown and described is adapted for molding hollow ware such as glass jars 20 (FIGS. 2 and 4) with neck portions 21. The operating parts are mounted on a stationary frame 22. The mold carriage or turret 23 includes a mold table 24 and a vertical shaft 25 (FIG. 4). Gear 26 is connected to the turret shaft 25. Means for rotating the turret comprises a rack 26a (FIGS. 3 and 4) in mesh with the gear 26 and power driven by piston motor 26c for intermittently rotating the turret step by step, the turret being rotated through 120° at each step rotation. The means for rotating the turret, including the rack 26a, may be the same as shown, for example, in Pat. No. 2,832,235, "Hydraulic Valve Control for Power Transmission Mechanism." The turret is held stationary after each step rotation by means of a locking detent (not shown) which engages a holding plate carried by the mold table. Neck rings or molds 27 for molding the neck portions 21 are mounted on the under side of the mold table 24.

A dual cavity parison mold 28 (FIG. 2) is carried on a plunger 28a of a hydraulically operated press having a stationary mounting in the press molding station "P." A pair of plungers 29 are mounted above the mold table and the dual cavity parison mold 28 in vertical alignment with the cavities therein and are adapted to move vertically downward through the neck rings 27 and to form parisons 30. The parisons 30, upon index of the turret 23, will be carried in the direction of the arrow shown on FIG. 1 to the blow station "B." In the blow station "B" the parisons are expanded within the blow molds to form the finished articles. When the parisons have been blown, the turret 23 is again indexed to carry the finished articles, still retained by the neck molds 27, to the takeout station "T." At the takeout station "T," the neck molds are adapted to be opened and the ware is released to a pair of dead plates 31. The dead plates 31 are mounted on a common plunger 32 which is hydraulically operated to raise and lower the dead plates 31 in sequence with the opening and closing of the neck molds 27 at the takeout station. Thus it can be seen that with the dead plates 31 raised to the position shown in FIG. 2, opening of the neck molds 27 will release the finished articles 20 and upon retraction of the dead plates 31, the articles will be lowered so as to have their neck portions 21 clear the underside of the neck molds 27. After the articles 20 have been lowered, the articles may be swept off or otherwise transferred from the dead plates 31 to a ware transfer table 33.

At the time the finished ware is positioned at the takeout station "T" and the dead plates 31 raised into approximate contact with the bottom portions of the ware 20, a pair of sizing and cooling heads 34 are lowered into the interior of the neck portion 21 of the ware 20. These heads 34 are mounted for vertical reciprocation by means of a hydraulic motor 35 having an output plunger 36 connected to a crosshead 37 to which the two sizing heads are connected. The plunger 36 of the hydraulic motor 35 is provided with an axial passage 38 throughout its length to which is connected a suitable source of air under pressure.

As can best be seen when viewing FIG. 4, the air under pressure admitted to the passage 38 of the plunger 36 will flow down therethrough where it connects with a pair of branch passages 39 and 40 provided within the crosshead 37. These passages 39 and 40 connect the air supply to the interior of the two individual sizing heads 34.

Turning now to FIGS. 5 to 7 there is shown in detail the particular structure of an individual sizing head 34. The sizing head 34 is generally cylindrical in shape and hollow throughout its length with its bottom end closed by a cover plate 41 which is fastened thereto by means of bolts 42. An opening 43 extends through the cover plate 41 and is provided with an internally tapered shoulder which serves as a valve seat. Extending through the opening 43 is a valve member 44 which has an enlarged head portion 45 which is adapted to seat within the opening 43. The valve 44 has its stem extending vertically above the cover plate 41 and passes through a guide block 46 which is mounted above the plate 41 by means of retaining screws 47. The upper end of the valve 44 is threaded and provided with an adjusting nut 48 threaded thereon. Above the nut 48 is a locking nut 49 which is also threaded on the stem of the valve 44. Extending between the nut 48 and the block 46 is a helical spring 50 which biases the valve 44 in the upward or closing direction. The sides of the mounting block 46 carry guide studs 51 which extend outwardly from the blocks 46. The studs 51 are adapted to provide guiding support for a plurality of inner surface contacting members 52. The members 52 are in the form of enlarged piston-like members having their surface contacting elements thereof positioned around the circumference of the sizing head 34. The shank portion 53 of the contacting members 52 extend through openings 56 provided in the side wall of the sizing head 34 and are internally drilled at 54 so as to provide openings within which the studs 51 are adapted to slide. The internal ends of the members 52 are enlarged and circular in shape and serve as pistons which are slidable in the openings in the head 34. Biasing springs are provided in the form of helical springs 55 compressed between the piston-like portions 52a of the members 52 and the restricted portion of the openings 56 provided in the sizing heads 34. These springs 55 will bias the members 52 toward the center of head 34 with a predetermined force. Thus it can be seen that upon the introduction of fluid, principally air, under pressure to the interior of the head 34, the members 52 will be forced outwardly to the position shown in FIG. 6 and upon the application of further pressure, the valve 44 will be unseated and its head portion 45 will move downwardly and allow the passage of air out through the opening 43 in the cover plate 41 thus providing cooling air to the interior of the ware 20 at the takeout station. While the head 34 is shown seated within an annular groove provided in the neck rings 27, there are numerous passages 56 which are formed in the lower corner of the head 34 and will allow the cooling air to pass out of the ware 20 without creating any internal pressure therein. Furthermore, when the neck molds 27 are opened the members 52 will be at their fully extended position and thus will maintain the neck portion of the ware 20 in its correct roundness and not exert any additional outward force on the neck portion of the ware.

While the above described mechanism for maintaining the neck portion of blown articles "in round" has been described as used with a press and blow type ware forming machine, it should be kept in mind that this mechanism is equally applicable to any other type of ware forming machine in which the neck molds are opened at the takeout station. Furthermore, this mechanism is equally applicable to maintaining container necks round at a position beyond the takeout station in that it can be applied to the internal neck portion of an article at any stage of its handling from the takeout station to entry of the article into the lehr. During this period the neck portion of the article is sufficiently plastic so that it may be sized and put "in round." Thus it can be seen that applicant's invention, when applied to the takeout station of forming machines may be used when the neck molds are closed or used after the neck molds have been opened. However, it should be kept in mind that when the device is applied with the neck molds closed, it should be maintained in contact with the interior neck portion of the article after the neck molds have been opened. This is important from the standpoint that occasionally the neck molds themselves may be out of round.

The particular construction given to the members which contact the internal surface of the neck of the ware may be selected depending upon the size and shape of the ware. Furthermore, the materials from which the members are made may be selected depending upon the type and temperature of the glass being used to form the ware.

While the above described mechanism has been specifically shown as being pneumatically actuated, it should be pointed out that a mechanical arrangement for moving the members into contact with the internal surface of the neck of the ware could be used. Also, the relative strength of the springs used may be selected depending upon the availability and pressure of the source of cooling air.

Various modifications may be resorted to within the spirit and scope of the appended claims.

I claim.

1. Apparatus for cooling and sizing the neck portion of a hollow glass article comprising a hollow head adapted to be inserted within the neck portion of an article while carried in a neck mold, means for conveying air to the interior of said head, an opening in said head, means for closing said opening with a constant, presetable force, a plurality of radially movable interior neck contacting members mounted in said head, said members being pneumatically actuatable, means biasing said members away from contact with said neck, said biasing means being of less effective force than said closing means whereby upon application of air under pressure to the interior of said head, said members are moved radially into neck contacting position first and then said closing means is opened to vent excessive pressure.

2. Apparatus for cooling and sizing the neck portion of a hollow glass article comprising a hollow retractable head, means for mounting said head for movement into and out of the neck portion of an article while retained in a neck mold, a plurality of radially extending ports in said head, a plurality of fluid actuated inner surface contacting members slidably received in said ports, said members being radially spaced about the circumference of said head, means normally biasing said members toward the center of said head, said members having piston heads on their inner ends, means for feeding air under pressure to the interior of said head whereby said air will force said members outward against the inner surface of said neck portion and maintain it round and of predetermined internal diameter.

3. In an apparatus for forming hollow blown articles wherein the articles are carried from station to station by neck molds during their formation, the improvement comprising an internal diameter maintaining head adapted to be moved into the neck of an article while being retained in said neck molds at the takeout station, said head being hollow throughout its length, means for introducing air into said head, means closing the end of said head that is introduced into said neck, said closing means including a spring biased valve member, a plurality of radially extending openings in the sidewall of said head adjacent the closed end thereof, a neck portion contacting member slidably received in each radial opening, each member having a piston head at the inner end thereof, spring means biasing each member toward the center of said head, whereby upon introduction of air under pressure to the interior of said head said members will be forced radially outward to their fullest extent and continued application of air will result in opening of said valve and venting of excess pressure.

4. In an apparatus for forming hollow blown glass articles wherein the articles are carried from station to station by neck molds during their formation, the improvement comprising an internal diameter maintaining head adapted to be moved into said neck molds at the takeout station, said head being hollow throughout its length, means for introducing air into said head, means closing the lower end of said head, said closing means including an upwardly biased valve member, a plurality of radially extending openings in the sidewall of said head adjacent the lower end thereof, an internal neck portion contacting member slidably received in each radial opening, each member having a piston head at the inner end thereof, spring means biasing each member toward the center of said head whereby upon introduction of air under pressure to the interior of said head, said members will be forced radially outward into contact with the inside of a hollow glass article and application of excessive air pressure will result in opening of said valve.

5. Apparatus for cooling and sizing the neck portion of hollow glass articles comprising a hollow elongated head, means for inserting said head within the neck portion of an article when positioned at the takeout station, means for supplying air under pressure to the interior of said head, an opening in the end of said head which is inserted in the neck of an article, said opening being in the form of an outwardly divergent valve seat, a cooperating valve body positioned in said seat, means for maintaining said valve closed with a presetable force, a plurality of radially extending passages through said head adjacent said end, a radially movable contacting member mounted in each said passage, means biasing said members toward the axis of said head, said biasing means being of less force than said closing means for applying air under pressure to the interior of said head whereby said members are moved outwardly into neck contacting position first and then said valve body is moved to open said opening to permit circulation of cooling air to the interior of said articles.

6. Apparatus for cooling and sizing the neck portion of hollow glass articles comprising a pair of hollow retractable heads, means mounting said heads for movement into and out of the neck portion of a pair of articles while retained in the neck molds, a plurality of radially extending ports in each said head, a plurality of fluid actuated surface contacting members slidably received in said ports, said members being radially spaced about the circumference of said heads, means normally biasing said members toward the center of said heads, said members having piston-like heads on their inner ends cooperable within said ports, means for simultaneously feeding air under pressure to the interior of said heads whereby said members will be forced into contact with the outward inner surface of the neck portion of said articles and maintain them round and of predetermined diameter when the neck molds are opened.

References Cited in the file of this patent
UNITED STATES PATENTS

| | | |
|---|---|---|
| 1,177,135 | Pawling | Mar. 28, 1916 |
| 1,177,613 | Garwood et al. | Apr. 4, 1916 |
| 2,903,824 | Denman et al. | Sept. 15, 1959 |